(No Model.)

J. P. PUTNAM.
WATER TRAP.

No. 311,087. Patented Jan. 20, 1885.

Witnesses: Inventor:

UNITED STATES PATENT OFFICE.

J. PICKERING PUTNAM, OF BOSTON, MASSACHUSETTS.

WATER-TRAP.

SPECIFICATION forming part of Letters Patent No. 311,087, dated January 20, 1885.

Application filed September 26, 1884. (No model.)

*To all whom it may concern:*

Be it known that I, JOHN PICKERING PUTNAM, of Boston, Massachusetts, have invented a new and useful Improvement in Water-Traps, of which the following is a specification.

In an application filed herewith I have described and in substance claimed a water-trap provided with a chamber between the dip and overflow, which is partially divided by a partition, the passages containing the said dip and overflow communicating with the said chamber on opposite sides of the said partition at or near the same end of the chamber. The said partition serves the purpose of increasing the distance in which water and air may travel in the chamber in a horizontal direction, in order to facilitate the separation of the heavy water from the light air, and furnishes additional reflecting or deflecting surface for the water. It also narrows the passage-way for the water at any one place in the chamber, in order that the trap may be self-scouring. One end of the chamber described in my said other application is in the form of a cap, which may be removed to clean or get at the inside of the trap.

The present invention consists, in part, in making the partitions removable as well as the cap. It consists, further, in a detail of construction, hereinafter especially set forth, by which the partition is made to do more effective work than in the construction represented in my said other application.

Figure 1:
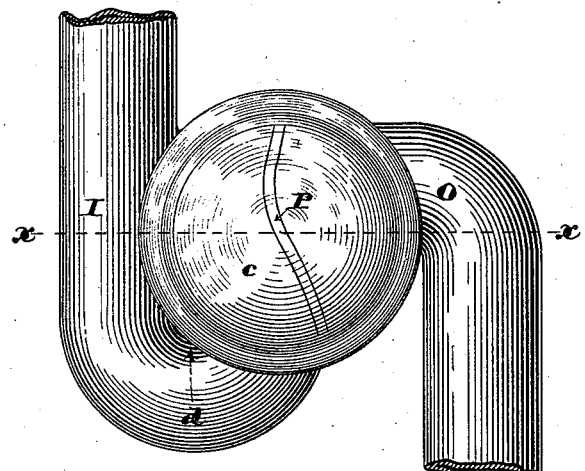
Figures 2, 3:
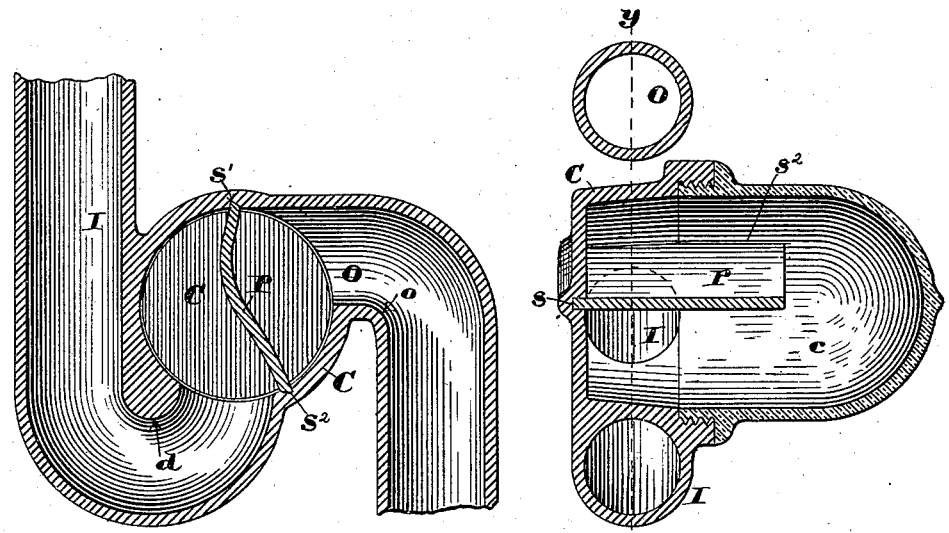

In the drawings, Figure 1 is a front elevation of the trap. Fig. 2 is a plan on line $x\ x$ of Fig. 1. Fig. 3 is a sectional elevation on line $y\ y$ of Fig. 2.

I is the lower or inlet passage of the trap, forming or containing the dip $d$. O is the upper or outlet passage, containing the overflow $o$. C is a cup-shaped casting interposed between the passages I and O, and $c$ is a cap screwing upon the casting $p$, the two together forming a pot or chamber for the trap. P is the partition, made to fit a slot, $s$, in the end of the casting C, and to readily slide in slots $s'$ $s^2$ in the sides of the casting. The partition in cross-section and the slot $s$ have, as shown, the form or shape of an ogee curve, and this shape for the partition will be found of advantage whether the partition be fixed or movable, for the slot $s'$ is in such close proximity to the exit-pipe or passage-way O that the upper curve of the partition P facilitates the passage of water through the trap, and thus increases the self-scouring capacity of the trap when water flows through the trap in its normal operation regardless of siphonage or suction, while, on the other hand, the lower curve of the partition, being immediately over the entrance from the dip, is in the most advantageous position to throw back water drawn in from the dip by siphonage or suction.

The trap herein described, when in position, works upon the general principle of the trap described in my application for a Patent No. 110,630, and its mode of operation needs no further description.

I claim—

1. A water-trap having between the dip and overflow thereof a chamber provided with a movable partition and a movable cap, substantially as described.

2. A water-trap having between the dip and overflow thereof a chamber which is partially divided by a partition, the passages containing the said dip and overflow communicating with said chamber near one end thereof, and on opposite sides of said partition, and the said partition having a double curve in cross-section, substantially as described.

J. PICKERING PUTNAM.

Witnesses:
   WALDRON BATES,
   WM. S. ROGERS.